United States Patent

[11] 3,542,152

| [72] | Inventors | Arthur P. Adamson;<br>Gordon D. Oxx, Jr.; William R. Morgan,<br>Cincinnati, Ohio |
|---|---|---|
| [21] | Appl. No. | 719,559 |
| [22] | Filed | April 8, 1968 |
| [45] | Patented | Nov. 24, 1970 |
| [73] | Assignee | General Electric Company<br>a corporation of New York |

[54] SOUND SUPPRESSION PANEL
10 Claims, 3 Drawing Figs.

[52] U.S. Cl. ..................................................... 181/50,
181/59, 181/71
[51] Int. Cl. ...................................................... B64d 33/06;
F01n 1/24
[50] Field of Search............................................ 181/33,
33.1, 33.22, 42, 50, 71, 48, 59

[56] References Cited
UNITED STATES PATENTS

| 2,609,068 | 9/1952 | Pajak | 181/33.1 |
| 2,826,261 | 3/1958 | Eckel | 181/33.22 |
| 2,978,571 | 4/1961 | Rosenblatt | 181/33.1 |
| 3,384,199 | 5/1968 | Eckel | 181/33.1 |
| 3,439,774 | 4/1969 | Callaway et al. | 181/42 |

FOREIGN PATENTS

| 222,770 | 7/1959 | Australia | 181/33(.1) |
| 1,145,742 | 5/1957 | France | 181/33(.1) |
| 1,166,394 | 6/1958 | France | 181/33(.1) |

Primary Examiner—Robert S. Ward, Jr.
Attorneys—Derek P. Lawrence, E.F. Berrier, Jr., L.H. Sachs, Frank L. Neuhauser, Oscar B. Waddell and Melvin M. Goldenberg ABSTRACT: A sound absorbing structural panel for use in turbojet engine air passages and having a plurality of elongated tubular chambers or resonator cavities substantially transversely disposed to the direction of air flow through the air passages and communicating with the air passages in various series/parallel arrangements through a plurality of apertures. The chambers and apertures are sized to provide broad frequency band resonant sound absorption between 500 and 12,000 cycles per second. The tubular chambers are substantially circumferentially continuous about the fan duct axis in a manner which enables free drainage of ingested liquid. Means may be provided adjacent the bottom portion of the cowling to allow drainage therethrough.

Patented Nov. 24, 1970
3,542,152
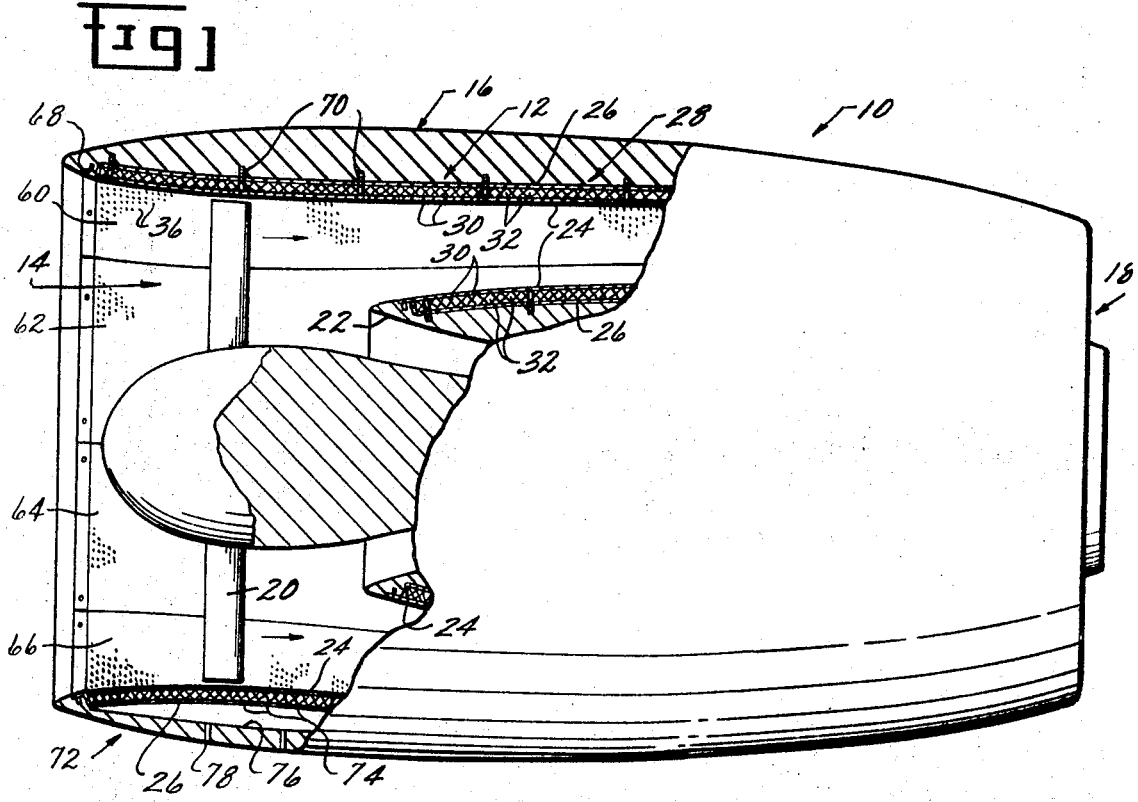
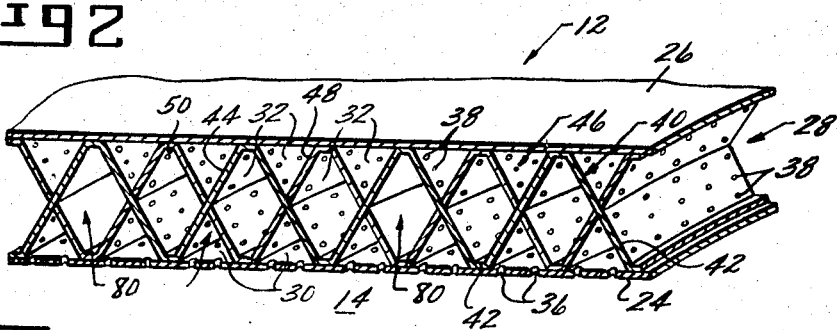
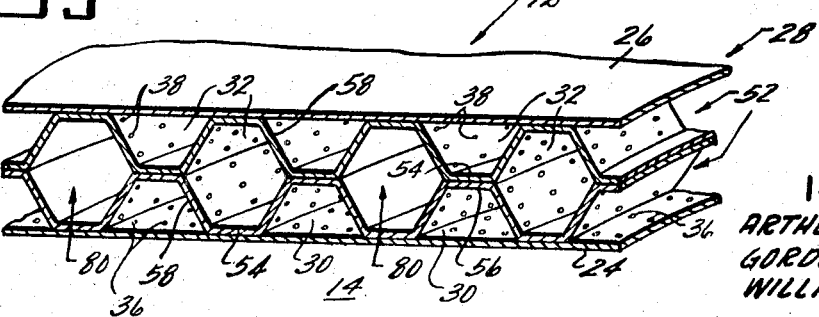
INVENTORS.
ARTHUR P. ADAMSON
GORDON D. OXX, JR.
WILLIAM R. MORGAN
ATTORNEY 3,542,152

SOUND SUPPRESSION PANEL

BRIEF SUMMARY OF THE INVENTION

This invention relates to sound absorbing structural panels and, more particularly, to a sound absorbing panel adapted to suppress noise within turbojet engine air passages.

Major objectives of current turbojet aircraft engines include the suppression of noise generated within the various engine passages. In a ducted fan configured engine it is of particular concern to suppress noise generated within the fan duct and occurring over a broad frequency band.

Material or structure to be employed in suppressing such noise must, however, be capable of withstanding and performing in the rigorous environmental conditions encountered within a turbojet engine fan duct which include aerodynamic as well as acoustical loading.

For example, although numerous fibrous materials are known which have high sound absorption characteristics over a broad frequency band, such materials generally suffer from one or more of the following disadvantages and are therefore believed unacceptable for use in aircraft engines: they tend to wick and absorb fuel or water or become clogged with deleterious matter thus increasing weight, decreasing performance and creating a possible fire hazard; they tend to erode even when retained by a perforated cover plate; and they generally lack cleanability, structural rigidity, and fatigue strength.

This invention then is concerned with a flight worthy panel structure in which broad band resonant sound absorption is realized and which is compatible with the environmental conditions encountered within an aircraft engine.

Accordingly, a primary object of this invention is to provide an improved structural panel which has high sound absorption characteristics over a broad frequency band.

Another object of this invention is to provide a panel as above-described which is lightweight, structurally integral, and easily cleaned.

A further object of this invention is to provide a sound absorbing structural panel which is self-draining.

Other objects and advantages of this invention will become apparent upon reading the following description of the preferred embodiments.

Briefly stated, in accordance with the illustrated embodiments, the panel structure of this invention comprises a plurality of discrete elongated tubular resonating chambers disposed along an air passage and communicating with the sound source or air passage in various series/parallel combinations through apertures which are sized relative to the chamber volumes to provide broad band resonant sound absorption. The resonating chambers are preferably substantially circumferentially disposed relative to the fan duct axis to enable cleaning and free drainage.

While the specification concludes with claims particularly pointing out and distinctly claiming the subject matter of this invention, it is believed the invention will be better understood from the following description of the preferred embodiments taken in connection with the accompanying drawing wherein:

FIG. 1 diagrammatically shows a side elevational view, in partial section, of a ducted fan type turbojet engine employing the sound suppression panel structure of this invention;

FIG. 2 is a perspective view in partial section of one embodiment of the sound suppression panel structure of this invention; and FIG. 3 is a perspective view in partial section of a further embodiment of the sound suppression panel structure of this invention.

DESCRIPTION OF THE PREFERRED EMBODIMENTS

Referring now to the drawing and particularly to FIG. 1, a ducted fan turbojet engine has been shown at 10 as having an annular generally streamline fan duct air passage 14 formed by an annular cowling 16 of generally streamline cross section and a suitable nacelle structure 18 projecting within the cowling 16.

As will be understood by those skilled in the art, the nacelle structure 18 houses a suitable compressor, combustor, and turbomachinery (not shown) for driving a fan 20 disposed within the cowling 16. The fan 20 is adapted to drive air axially through the air passage 14 (direction indicated by arrow in FIG. 1) to provide propulsive thrust to the engine 10 as well as supply air to the compressor through a suitably formed air passage 22.

In driving air through the fan duct air passage 14, the fan 20 produces objectionable noise levels particularly at takeoff and landing approach. The primary frequency of the noise generated by the fan 20 is the blade passing frequency which is defined as the revolutions per second of the fan 20 multiplied by the number of fan blades. In addition to the blade passing frequency, the fan 20 generates broad spectrum noise the most objectionable of which is believed to reside within a frequency band extending from about 500 cycles per second to about 12,000 cycles per second. The intensity and pressure level of such noise is quite high. For example, at the blade passing frequency and various harmonics thereof the pressure level may be 160 db. or higher while over the remaining portion of the spectrum, it be as high as 140 db. or more.

Referring again to FIG. 1, the sound suppression panel structure has been shown generally at 12 as comprising a facing sheet 24 adapted to define, in part, the fan duct air passage 14; a radially spaced backer sheet 26; and core means 28 extending therebetween and defining in conjunction with the facing sheet 24 and backer sheet 26 a plurality of discrete primary chambers or resonating cavities 30 and a plurality of discrete secondary chambers or resonating cavities 32.

Although the panel structure 12 of this invention has been shown and has been and will hereinafter be described in connection with the fan duct air passage 14, it should be understood that such structure may be advantageously employed within other engine air passages. Further, although the panel structure 12 is particularly adapted for use on aircraft engines it should be understood that it may be employed in a variety of structures enclosing sound sources.

As best seen in FIGS. 2 and 3, each primary chamber 30 communicates with the fan duct air passage 14 and sound source through a plurality of apertures or passages 36 formed in the facing sheet 24. A plurality of apertures or passages 38 are likewise provided in the core means 28 to selectively communicate secondary chambers 32 with each other and/or with the primary chambers 30. Accordingly, a variety of series/parallel chamber combinations communicating with the fan duct air passage 14 and sound source 20 may be provided. By varying the number and size of the passages 36 communicating with each primary chamber 30, the volume of each primary chamber 30, the number and size of passages 38 communicating secondary chambers 32 with each other and with primary chambers 30, the volume of each secondary chamber 32 and the series/parallel relationship between the chambers 30, 32 and the air passage 14, the panel 12 may, in accordance with well known acoustical technology, be made to have two or more acoustical resonant frequencies between 500 and 12,000 cycles per second with resultant high energy acoustical absorption within this frequency band.

The passages 36 and 38 may be variously shaped and may, for example, be circular, square, rectangular or irregular. However, to insure free passage of liquid through such passages, it is preferred that they be sized so that opposed passage walls are at least about .05 inch apart.

The core means 28 generally comprises a plurality of variously configured load bearing, structural wall forming members or elements suitably joined to each other, facing sheet 24, and backer sheet 26 to form the discrete chambers 30 and 32. For example, as shown in FIG. 2, the core means 28 comprises a corrugated sheet member 40 having spaced, alternating ridges 42 joined by inclined sidewalls 44 to form a plurality of alternating, oppositely facing grooves and a plurality of V-shaped members 46 having inclined sidewalls 48 joined by a bottom surface or ridge 50. Each V-shaped member 46 is generally coextensive with the corrugated member 40 and is secured thereto within a corrugated member groove along the upper edges of each inclined sidewall 48 as shown in FIG. 2. Facing sheet 24 and backer sheet 26 are suitably secured to opposite sides of the core means 28 along each ridge 42 and each V-shaped member ridge 50.

Another embodiment has been shown in FIG. 3 as having core means 28 comprising two similar corrugated sheet members 52 having spaced alternating ridges 54 and 56 joined by inclined sidewalls 58 to form a plurality of alternating, oppositely facing grooves. The corrugated members 52 are suitably secured together with each ridge 54 of one corrugated member abutting an aligned ridge 56 of the other corrugated member as shown in FIG. 3. Facing sheet 24 and backer sheet 26 are suitably secured in spaced relation to opposite sides of the core means 28 along respective ridges 54 and 56 of each corrugated member 52.

As previously noted, the acoustical energy generated within the fan duct at the blade passing frequency and various harmonics thereof may be quite high. Accordingly, it is preferred that each chamber forming wall portion be sized so that its natural mechanical resonant frequency does not coincide with the blade passing frequency.

Referring again to FIG. 1, the tubular chambers 30 and 32 have been shown extending transversely to the direction of air flow through the fan duct 14 and are preferably circumferentially continuous to provide a generally free drainage path for liquid such as water or fuel ingested by the panel 12.

To facilitate manufacture and installation, the panel structure 12 may be conveniently formed as a plurality of arcuate segments such as segments 60, 62, 64 and 66 in FIG. 1 of any convenient axial length.

The panel structure 12 may be adapted to be secured within the air passage by any suitable means such as a mounting flange 68 or fastener receiving passages 70.

Suitable means 72 may be provided adjacent the lowermost portion of the cowling sound suppression panel 12 to allow free drainage of liquid ingested by the panel structure through the cowling. For example, the backer sheet 26 may be provided with a plurality of passages 74 communicating each adjacent secondary chamber 32 with a common liquid collection trough 76 which in turn is communicated to the atmosphere through one or more drainage port 78 formed in the cowling 16. Accordingly, cleaning of the sound suppression panel 12 may be readily accomplished by either washing with a suitable liquid or by removal of panel segments 60, 62, 64 and 66 and insertion of a wire or other suitable brush within each tubular chamber 30, 32.

With the chambers 30 and 32 arranged transversely to the air flow through the fan duct air passage 14, the flow of air through the panel 12 due to axial pressure variance along the air passage 14 is minimized. However, to essentially stop all such air flow through the panel 12 it is preferred that selective portions of the core means 28 be imperforate so as to form a plurality of axially spaced generally circumferentially continuous air dams 80 extending between the facing sheet 24 and backer sheet 26. To this end, for example, in the embodiment of FIG. 2, the air dams 80 may be formed by selectively leaving portions of the corrugated member 40 and V-shaped member 46 imperforate while in the embodiment of FIG. 3, the air dams 80 have been formed by leaving selective corrugated member inclined wall sections 58 imperforate.

The facing sheet 24, backing sheet 26, and the core means 28 may be formed using any suitable material such as metals, plastics, ceramics, etc. which are essentially rigid and have adequate mechanical properties.

The core means forming elements, such as corrugated member 40 and V-shaped members 46 or corrugated members 52, may be jointed to each other, the facing sheet 24 and backer sheet 26 by any suitable means such as welding, brazing, or by the use of a suitable adhesive.

Although a preferred embodiment of the invention has been depicted and described, it should be understood that many additions, alterations, and variations may be made without departing from the invention's fundamental theme. Further, although the invention has been described as being particularly applicable to turbojet engines, it should be understood that usage is not limited to any specific machinery, and the panel structure of this invention can, in fact, be applied to a multiplicity of sound sources surrounded by structure. Accordingly, the scope of the invention should be limited only by the scope of the following appended claims.

We claim:

1. A broad band resonant sound absorbing structure for use in silencing noise within an air passage, said structure comprising a facing sheet adapted to define at least a portion of said air passage, a backer sheet in spaced relationship with said facing sheet, core means extending between and secured to said facing sheet and said backer sheet and forming, in cooperation with said sheets, a plurality of primary resonant chambers and a plurality of secondary resonant chambers, a plurality of apertures formed in said facing sheet for communicating said air passage with said primary resonant chambers, a plurality of apertures formed in said core means for communicating a first group of said secondary resonant chambers with said primary chambers and for communicating the remaining ones of said secondary resonant chambers with at least one of said first group of secondary resonant chambers, with said primary chambers, said secondary chambers and said apertures sized to produce broad band resonant sound absorption.

2. The sound absorbing structure of claim 1 further characterized in that each said aperture is circular and at least about .05 inch in diameter to enable free passage of liquid therethrough.

3. The sound absorbing structure of claim 1 further characterized in that said primary chambers, said secondary chambers and said apertures are sized to have at least two acoustical resonant frequencies between about 500 cycles per second and about 12,000 cycles per second.

4. The sound absorbing structure of claim 1 further characterized in that said core means comprise:

a corrugated sheet member having a plurality of inclined side-walls joining spaced ridges and defining a plurality of alternating oppositely facing elongated grooves; and a V-shaped structural member having inclined sidewalls joined by a bottom surface and positioned within each said corrugated member groove with said V-shaped member sidewalls abutting and joined to the corrugated member sidewalls forming said groove, with said facing sheet and said backer sheet secured to said core means along said corrugated member ridges and said V-shaped member bottom surfaces to thereby form said primary and secondary chambers.

5. The sound absorbing structure of claim 1 further characterized in that said core means comprise:

a first corrugated sheet member and a second corrugated sheet member;

each said corrugated member having a plurality of spaced alternating first and second ridges connected by inclined sidewalls; and said first and second corrugated members secured together with each said first ridge of said first corrugated member aligned with and abutting one of said second ridges of said second corrugated member, with said facing sheet secured to said first corrugated member along each aid second ridge and said backer sheet secured to said second corrugated member along each said first ridge to thereby form said primary and secondary chambers.

6. In a turbojet engine of the type having a fan disposed within an annular fan duct air passage, an improved resonant sound absorbing panel structure for silencing noise within said fan duct, said panel structure comprising:

a facing sheet adapted to form at least a portion of said annular fan duct;

a backer sheet radially spaced from said facing sheet;

core means extending between and secured to said facing sheet and said backer sheet for defining a plurality of discrete, substantially circumferentially extending, elongated tubular resonating chambers having generally rigid sidewalls; and said facing sheet formed with a plurality of apertures effective to communicate said fan duct air passage with a first group of said chambers and said core means formed with a plurality of apertures effective to communicate the others of said chambers with said fan duct air passage through at least one chamber of said first group of chambers, with said chambers and said apertures sized to provide resonating sound absorption over a broad frequency band.

7. The improved panel structure of claim 6 further characterized in that said frequency band extends from about 500 cycles per second to about 12,000 cycles per second.

8. The improved panel structure of claim 6 further characterized in that each said chamber is substantially circumferentially continuous about the fan duct axis to thereby allow passage of ingested liquid to the lowermost chamber of said panel structure and hence out of said panel structure.

9. The improved panel structure of claim 8 further characterized by and including means formed adjacent the lowermost chambers of said panel structure to allow discharge of said liquid through said backer sheet to the atmosphere.

10. The improved panel structure of claim 6 further characterized in that selective ones of said chamber sidewalls are imperforate to thereby form a plurality of circumferentially extending, axially spaced air dams extending between said facing sheet and said backer sheet operative to curtail air flow through said panel structure.